(12) United States Patent
Ando

(10) Patent No.: US 10,737,517 B2
(45) Date of Patent: Aug. 11, 2020

(54) PRINTER

(71) Applicant: Seiko Instruments Inc., Chiba-shi, Chiba (JP)

(72) Inventor: Norihisa Ando, Chiba (JP)

(73) Assignee: SEIKO INSTRUMENTS INC., Chiba (JP)

(*) Notice: Subject to any disclaimer, the term of this patent is extended or adjusted under 35 U.S.C. 154(b) by 0 days.

(21) Appl. No.: 16/292,453

(22) Filed: Mar. 5, 2019

(65) Prior Publication Data

US 2019/0275815 A1 Sep. 12, 2019

(30) Foreign Application Priority Data

Mar. 8, 2018 (JP) .................. 2018-041616

(51) Int. Cl.
| | | |
|---|---|---|
| B41J 29/02 | (2006.01) | |
| F16B 2/22 | (2006.01) | |
| B41J 29/13 | (2006.01) | |
| F16B 2/10 | (2006.01) | |
| F16B 21/09 | (2006.01) | |
| F16B 21/08 | (2006.01) | |
| B41J 3/407 | (2006.01) | |

(52) U.S. Cl.
CPC ............. B41J 29/02 (2013.01); B41J 3/4075 (2013.01); B41J 29/023 (2013.01); B41J 29/13 (2013.01); F16B 2/10 (2013.01); F16B 2/22 (2013.01); F16B 21/088 (2013.01); F16B 21/09 (2013.01)

(58) Field of Classification Search
CPC ........ B41J 3/4075; B41J 29/023; B41J 29/13; B41J 29/02; F16B 2/10; F16B 21/088; F16B 21/09
See application file for complete search history.

(56) References Cited

U.S. PATENT DOCUMENTS 6,540,122 B1 4/2003 Petersen
2012/0050448 A1 3/2012 Sakaino

FOREIGN PATENT DOCUMENTS

| JP | 2002-353840 A | 12/2002 |
|---|---|---|
| JP | 2015-160427 A | 9/2015 |
| JP | 2018-001438 A | 1/2018 |
| WO | WO 2002/009054 A2 | 1/2002 |
| WO | WO 2011/130330 A2 | 10/2011 |

OTHER PUBLICATIONS

Extended European Search Report in Europe Application No. 19161392.6, dated Jul. 23, 2019, 10 pages.

*Primary Examiner* — Lamson D Nguyen

(74) *Attorney, Agent, or Firm* — Brinks Gilson & Lione

(57) ABSTRACT

A printer for printing information on a recording sheet, includes a housing configured to accommodate a recording sheet and a printing portion; a battery to be removably mounted to the housing; and a clip pivotably mounted to the housing. The clip includes a joint portion, which is elastically deformable so that a coupling portion of the housing is pivotably fitted to the joint portion. Each of the joint portion and the coupling portion includes an engagement portion configured to restrain the clip from pivoting at a mounting position at which the clip covers at least a part of the battery. When a predetermined external force is applied to the housing in a pivoting direction of the clip, restraining of the clip by the engagement portions is canceled so that the clip is movable from the mounting position.

8 Claims, 12 Drawing Sheets sed # PRINTER

RELATED APPLICATIONS

This application claims priority under 35 U.S.C. § 119 to Japanese Patent Application No. 2018-041616 filed on Mar. 8, 2018, the entire content of which is hereby incorporated by reference.

BACKGROUND OF THE INVENTION

1. Field of the Invention

The present invention relates to a printer.

2. Description of the Related Art

Hitherto, there have been widely used portable devices such as a mobile printer, which may be readily carried by a person. In general, such portable device includes a battery that is to be removably mounted to a housing so as to enable the portable device to be used under a cordless state. Further, in many cases, the portable device includes a belt clip (hereinafter, referred to as "clip") in order to enable a user to use the portable device while wearing the portable device on a belt or the like.

In the portable device of this type, in order to prevent falling off of the battery mounted to a rear surface of the housing, the clip is provided on the rear surface of the housing so as to cover a part of the battery. However, in a case of employing such a structure that the clip covers the battery, the clip obstructs mounting and removal of the battery, and hence such a trouble as temporarily removing the clip is required. Meanwhile, in order to remove the battery, when employing such a configuration that the clip is pivotable about a support portion formed in the rear surface of the housing, the number of parts is increased, resulting in uneconomical.

In view of this, in the portable device of this type, it has been required that prevention of falling off of the battery and reduction in number of parts may be achieved.

SUMMARY OF THE INVENTION

According to one embodiment of the present invention, there is provided a printer, including a housing configured to accommodate a recording sheet and a printing portion; a battery to be removably mounted to the housing; and a clip pivotably mounted to the housing, wherein the clip includes a joint portion, which is elastically deformable so that a coupling portion of the housing is pivotably fitted to the joint portion, wherein each of the joint portion and the coupling portion includes an engagement portion configured to restrain the clip from pivoting at a mounting position at which the clip covers at least a part of the battery, and wherein, when a predetermined external force is applied to the housing in a pivoting direction of the clip, restraining of the clip by the engagement portions is canceled so that the clip is movable from the mounting position.

In the above-mentioned printer according to the one embodiment of the present invention, the printer further including a battery accommodation portion, which is formed in the housing such that the battery is to be removably mounted therein, wherein the coupling portion is a recessed portion having an opening portion, which is formed in a side wall of the battery accommodation portion such that the joint portion is to be removably fitted therethrough.

In the above-mentioned printer according to the one embodiment of the present invention, wherein the engagement portion of the joint portion and the coupling portion comprises at least two engagement portions formed along the pivoting direction of the clip at a given interval.

In the above-mentioned printer according to the one embodiment of the present invention, wherein the joint portion comprises a plurality of groove portions formed along the pivoting direction of the clip so that deformation of the joint portion is allowed when the clip is pivoted.

In the above-mentioned printer according to the one embodiment of the present invention, wherein the plurality of groove portions of the joint portion are formed so as to be opposed to one another across a pivot center of the joint portion.

DETAILED DESCRIPTION OF THE PREFERRED EMBODIMENTS

First Embodiment

Figure 1:
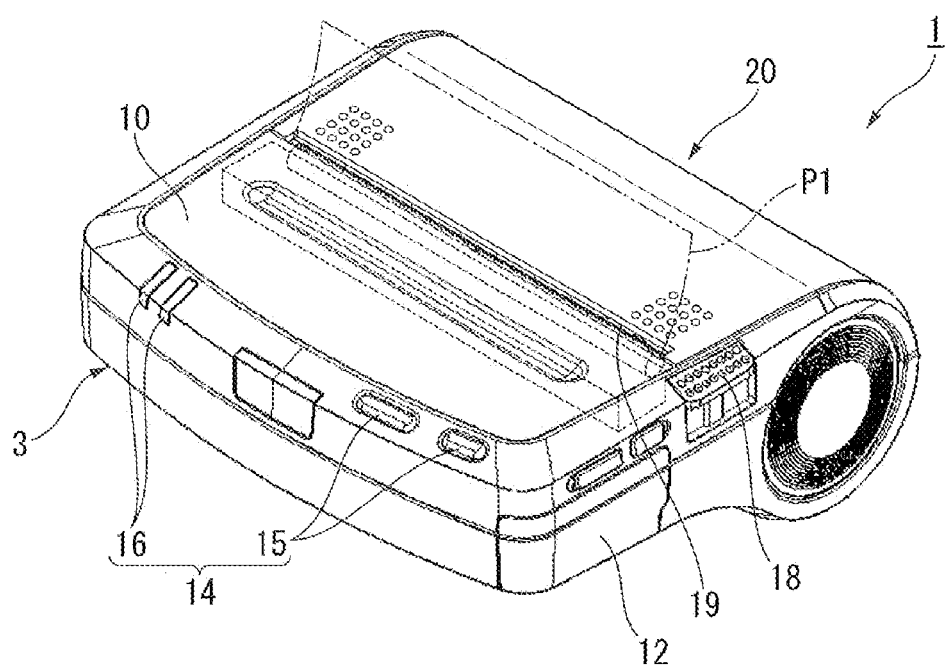
FIG. 1 is a perspective view for illustrating a printer according to a first embodiment of the present invention when a paper cover is positioned at a closed position.
Figure 1:
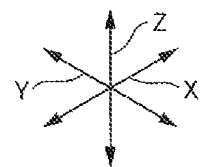
Figure 2:
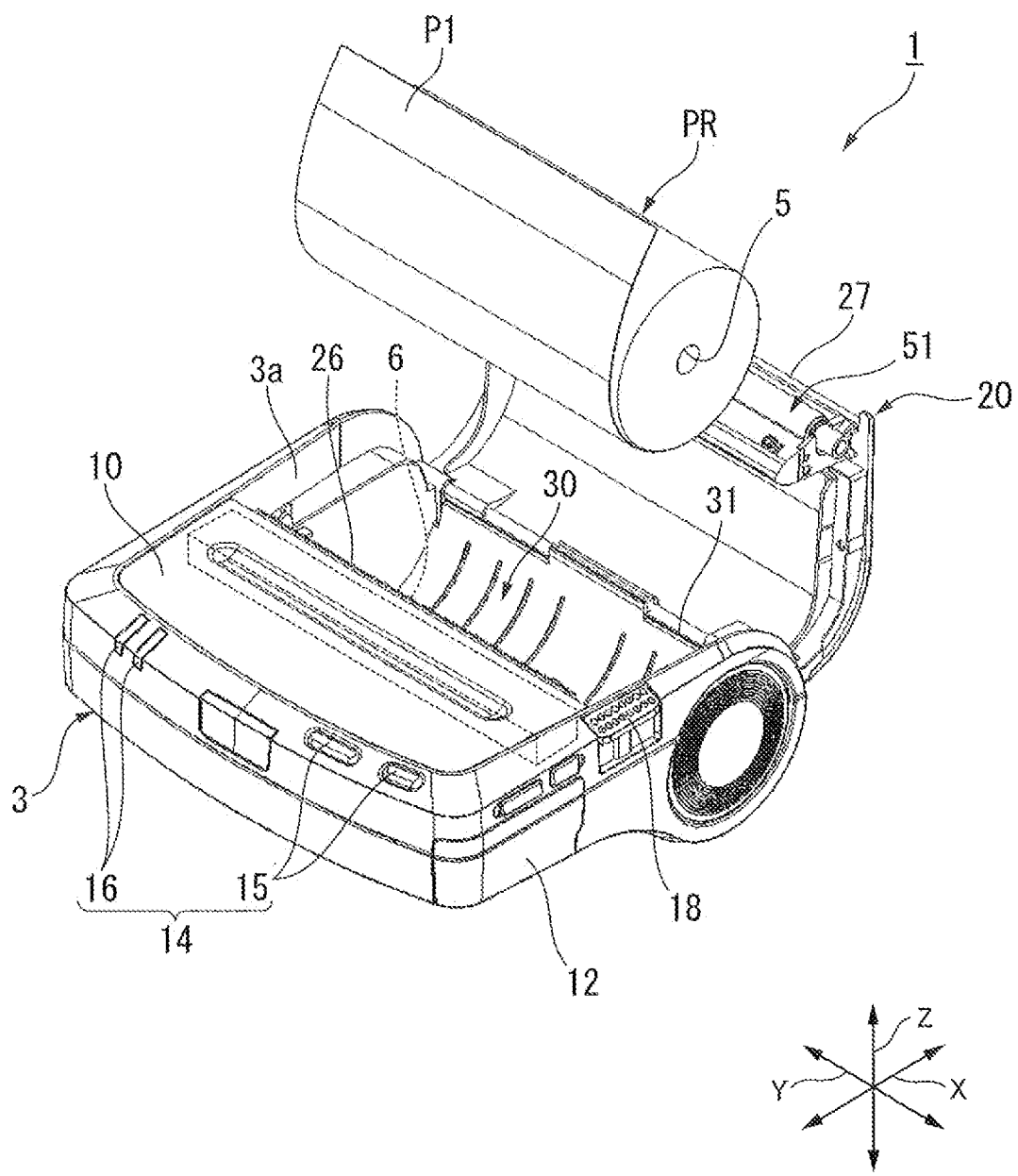
FIG. 2 is a perspective view for illustrating the printer according to the first embodiment of the present invention when the paper cover is positioned at an open position.

FIG. 1 is a perspective view for illustrating a printer 1 as seen from a front surface side thereof when a paper cover 20 is positioned at a closed position. FIG. 2 is a perspective view for illustrating the printer 1 as seen from the front surface side when the paper cover 20 is positioned at an open position. In FIG. 1 and FIG. 2, illustration is made of the printer 1 to be used under a state of being placed on an installation surface. In the following description, in the drawings, a direction indicated by the arrows X, a direction indicated by the arrows Y, and a direction indicated by the arrows Z are defined as a length direction, a width direction, and an up-and-down direction, respectively.

As illustrated in FIG. 1, the printer 1 is configured to be capable of performing printing on a recording sheet P1. In a first embodiment of the present invention, a thermal printer is given as an example of the printer 1, but the printer 1 is not limited to the thermal printer. The recording sheet P1 is a heat-sensitive sheet that develops color through application of heat, and is suitably used for printing, for example, a variety of labels, receipts, and tickets. As illustrated in FIG. 2, the recording sheet P1 is set in the printer 1 under a state of a roll sheet PR having a hollow hole 5, which is obtained by winding the recording sheet P1. A printing portion 6 is configured to perform printing on a part drawn out from the roll sheet PR.

The printer 1 includes a casing (housing) 3 having an opening portion 3a, the paper cover 20 configured to open and close the opening portion 3a of the casing 3, a battery 40 for charging, and a belt clip (clip) 50 (see FIG. 3) for carrying. Further, a printer module 30 is mounted inside the printer 1.

The casing 3 is made of plastic such as polycarbonate or a metal material. The casing 3 is formed into such a box shape that a region on one side in the X direction is formed into a substantially rectangular parallelepiped shape having a front wall 10, and that a region on another side in the X direction is opened to one side in the Z direction (to the front wall 10 side). For example, a rib (not shown) is formed on an inner surface of the casing 3, thereby reinforcing mechanical strength of the casing 3. An operation unit 14 is arranged on the front wall 10 of the casing 3, and is configured to perform various operations of the printer 1.

Various function switches 15 such as a power switch and a FEED switch are arranged in the operation unit 14. Moreover, various indicators 16 are arranged in the operation unit 14 to be adjacent to the various function switches 15. Examples of the indicators 16 include a POWER indicator configured to indicate information of an ON/OFF state of the power switch, and an ERROR indicator configured to indicate, for example, an error of the printer 1. Further, an open button 18 for the paper cover 20 is provided between the front wall 10 and a side wall 12 of the casing 3. Moreover, a first cutting blade 26 configured to cut the recording sheet P1 is formed at an edge of the front wall 10 of the casing 3 on the another side in the X direction.

The paper cover 20 is made of plastic such as polycarbonate. A proximal end portion of the paper cover 20 on the another side in the X direction is supported by a hinge shaft so that the paper cover 20 is rotatable with respect to a main body frame 31 of the printer module 30. Further, a distal end portion of the paper cover 20 is configured to be capable of being locked to the main body frame 31 by a platen roller 51 mounted to the distal end portion of the paper cover 20. Through pressing of the open button 18 of the casing 3, locking between the paper cover 20 and the casing 3, in which the main body frame 31 is mounted, is cancelled so that the paper cover 20 may be opened from the closed position (see FIG. 1) to the open position (see FIG. 2).

Further, as illustrated in FIG. 1, when the paper cover 20 is positioned at the closed position, a gap is defined along the width direction of the recording sheet P1 between a distal edge of the paper cover 20 and the edge of the front wall 10 of the casing 3 on the another side in the X direction. The gap forms a delivery slot 19 through which the recording sheet P1 subjected to printing is delivered. Moreover, a second cutting blade 27 (see FIG. 2) configured to cut the recording sheet P1 is formed at the distal end portion of the paper cover 20. Printing is performed on the recording sheet P1 in the printing portion 6, and the recording sheet P1 subjected to printing is delivered through the delivery slot 19. The recording sheet P1 delivered through the delivery slot 19 is cut by being pulled down in a contact state with the first cutting blade 26 or the second cutting blade 27.

Figure 3:
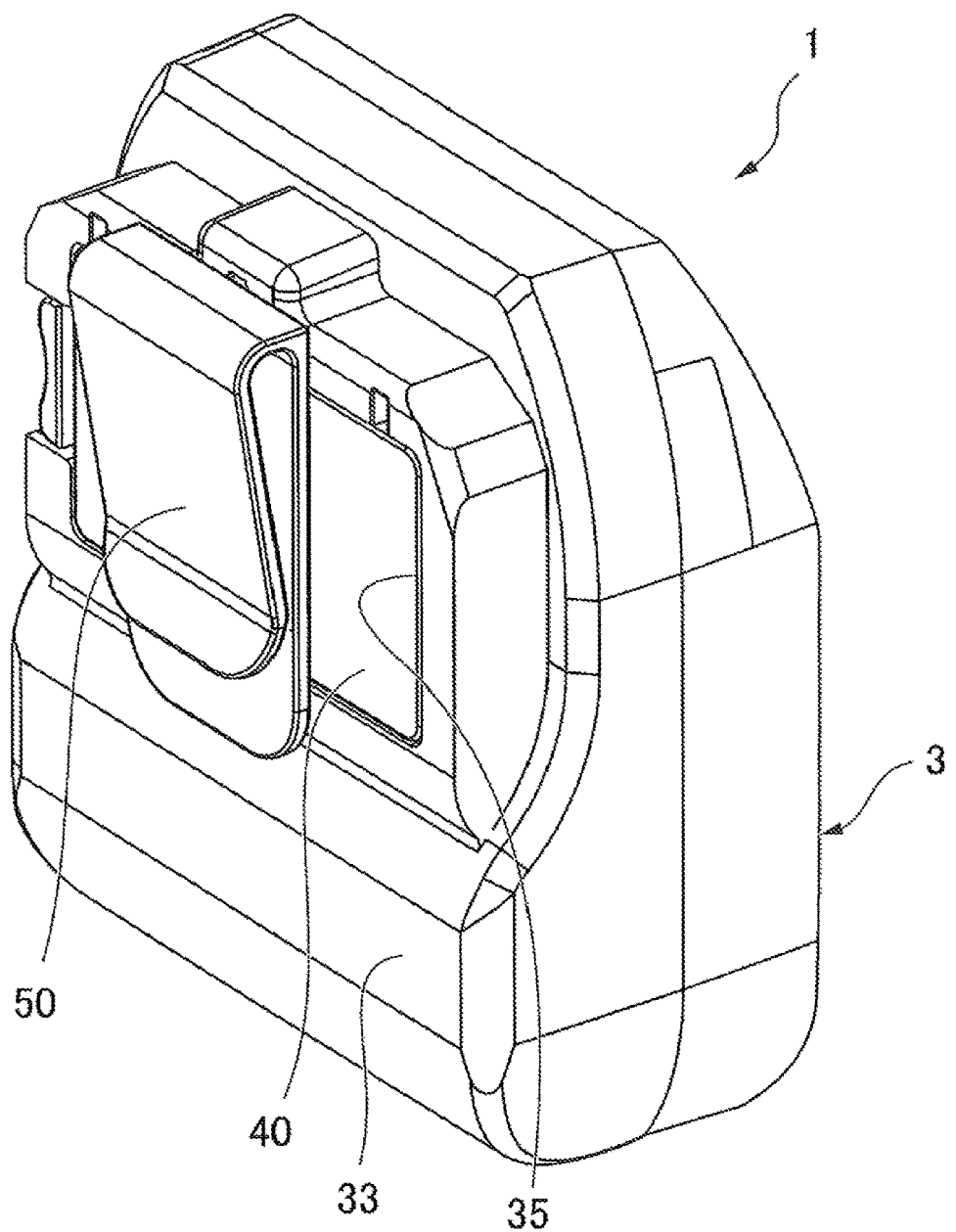
FIG. 3 is a perspective view for illustrating the printer according to the first embodiment of the present invention as seen from a back wall side thereof.
Figure 3:
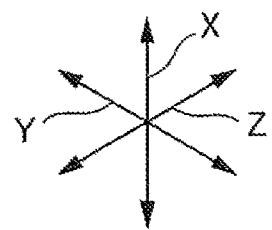

FIG. 3 is a perspective view for illustrating the printer 1 as seen from a back wall 33 side. As illustrated in FIG. 3, the battery 40 and the belt clip 50 are mounted to the back wall 33 of the casing 3. A battery accommodation portion 35 is formed on the back wall 33 of the casing 3. The battery 40 is removably mounted to the battery accommodation portion 35. The battery 40 is formed into a rectangular shape. When the battery 40 is accommodated in the battery accommodation portion 35, the battery 40 may be used as a power source for the printer 1. Thus, the printer 1 may be used as a portable terminal in a cordless state.

Figure 4:
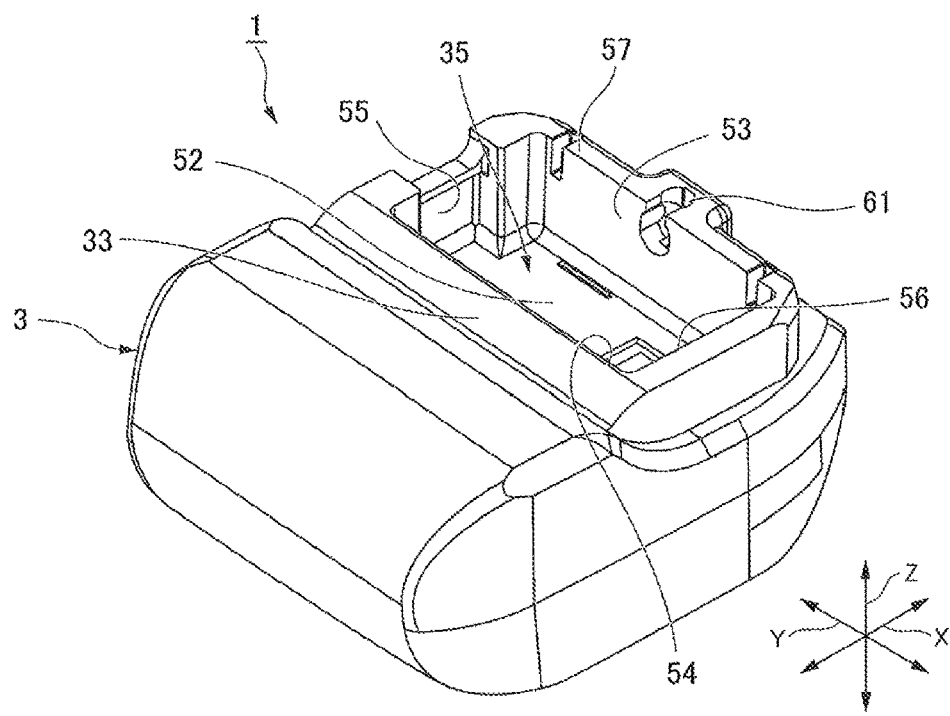
FIG. 4 is a perspective view for illustrating the printer according to the first embodiment of the present invention from which a belt clip and a battery are removed.

FIG. 4 is a perspective view for illustrating the printer 1 from which the belt clip 50 and the battery 40 are removed. As illustrated in FIG. 4, the battery accommodation portion 35 includes an accommodation bottom portion 52 and an accommodation opening portion 57. The accommodation opening portion 57 is formed into a rectangular recessed shape by first to fourth side walls 53 to 56 to be opened in the back wall 33. The accommodation bottom portion 52 is formed into a rectangular shape. The first to fourth side walls 53 to 56 extend upright from four sides of the accommodation bottom portion 52 toward the back wall 33, and thus form a rectangular frame shape. The first side wall (side wall) 53 and the second side wall 54 are formed with an interval in the X direction. The first side wall 53 is formed at an end portion of the back wall 33 of the casing 3 on the one side in the X direction. The second side wall 54 is formed at a center region of the back wall 33 of the casing 3 in the X direction. The third side wall 55 and the fourth side wall 56 are formed with an interval in the Y direction. The battery 40 is freely removably accommodated in the battery accommodation portion 35 through the accommodation opening portion 57 formed in the back wall 33 of the casing 3.

Figure 5:
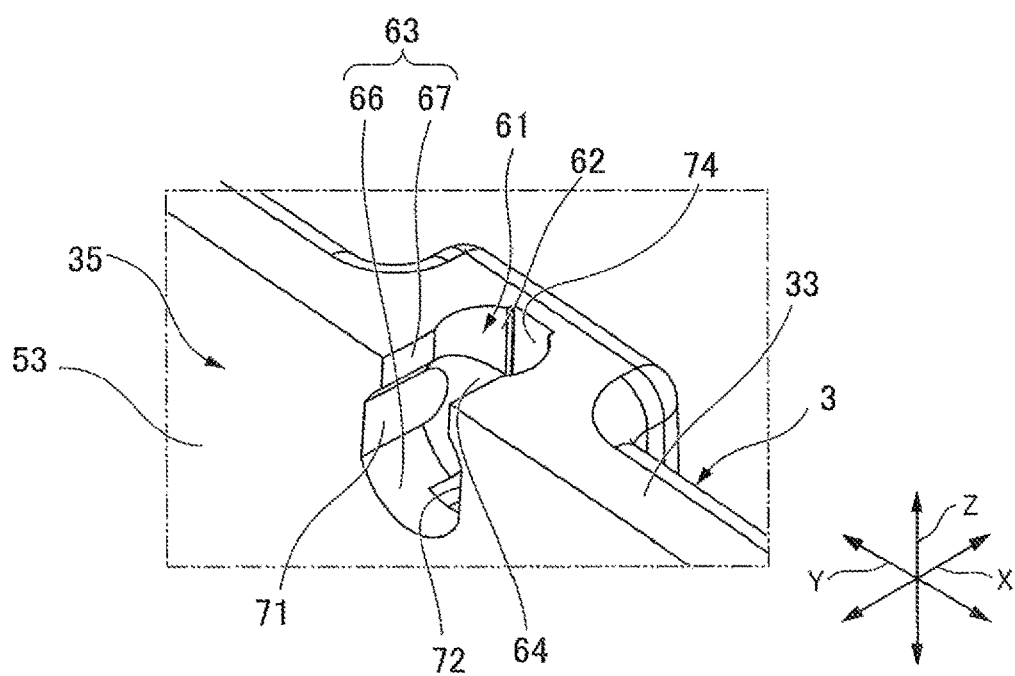
FIG. 5 is a perspective view for illustrating a coupling portion of a casing in the first embodiment of the present invention.
Figure 6:
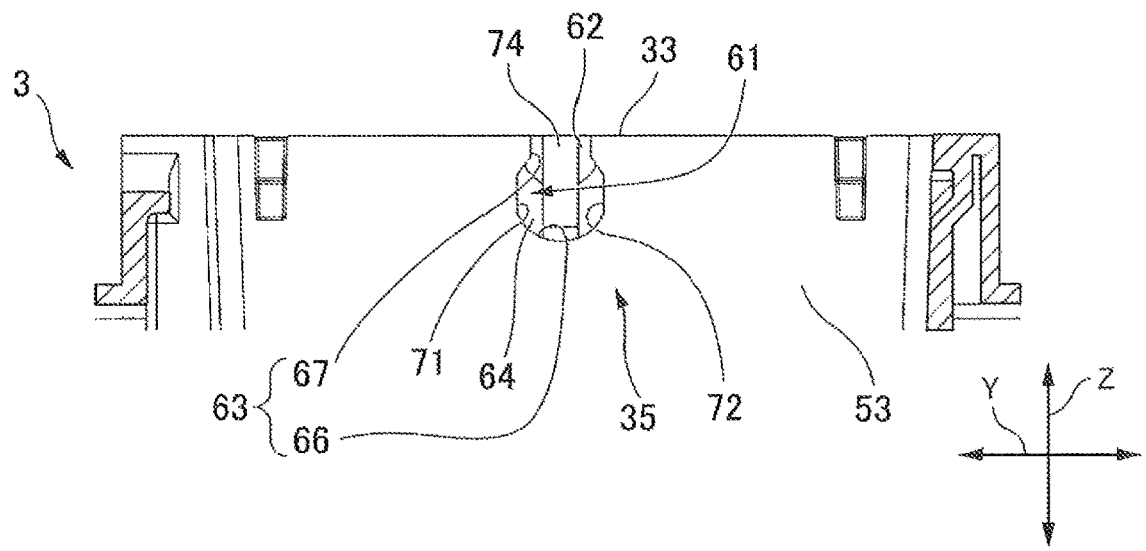
FIG. 6 is a front view for illustrating a state in which the coupling portion of the casing in the first embodiment of the present invention is seen from a battery accommodation portion side.

FIG. 5 is a perspective view for illustrating a coupling portion 61 of the casing 3. FIG. 6 is a front view for illustrating a state in which the coupling portion 61 of the casing 3 is seen from the battery accommodation portion 35 side. As illustrated in FIG. 5 and FIG. 6, the coupling portion 61 is formed in the back wall 33 of the casing 3. The coupling portion 61 is formed so as to communicate with the battery accommodation portion 35. The coupling portion 61 includes a first opening portion 62, a second opening portion (opening portion) 63, and a spherical receiving portion 64. The coupling portion 61 is formed into a recessed portion by the first opening portion 62, the second opening portion 63, and the spherical receiving portion 64. The first opening portion 62 is formed at a vicinity of the first side wall 53 and at a center in the Y direction in the back wall 33 of the casing 3, and has an arc shape with a diameter D1. The first opening portion 62 is formed so as to communicate with the spherical receiving portion 64 in the Z direction. The second opening portion 63 is formed at a center in the Y direction in the first side wall 53 of the battery accommodation portion 35.

The second opening portion 63 includes a circular opening portion 66 and a connecting opening portion 67. The circular opening portion 66 is formed into a circular shape with a diameter D2, and is formed so as to allow the battery accommodation portion 35 to communicate with the spherical receiving portion 64 in the X direction. The connecting opening portion 67 is formed so as to allow the battery accommodation portion 35 to communicate with the first opening portion 62 in the X direction. An opening width W1 of the connecting opening portion 67 in the Y direction is set to be smaller than the diameter D1 of the first opening portion 62 and the diameter D2 of the circular opening portion 66.

The spherical receiving portion 64 is formed so as to communicate with the circular opening portion 66 and the first opening portion 62. The spherical receiving portion 64 is formed into a spherical shape having a dimension of a diameter D3. The diameter D3 of the spherical receiving portion 64 is set to be equal to the diameter D2 of the circular opening portion 66 and larger than the diameter D1 of the first opening portion 62. On both side regions of the spherical receiving portion 64 and the circular opening portion 66, which are opposed to each other in the Y direction, a pair of chamfered portions 71 and 72 is formed to be flat. In the following description, the pair of chamfered portions 71 and 72 is referred to as the first chamfered portion 71 and the second chamfered portion 72. A chamfer width W2 between the first chamfered portion 71 and the second chamfered portion 72 is set to be smaller than the diameter D3 of the spherical receiving portion 64 and the diameter D2 of the circular opening portion 66.

A guide groove portion 74 is formed at a center in the Y direction of a region containing the spherical receiving portion 64, the first opening portion 62, and the circular opening portion 66. Specifically, the guide groove portion 74 extends from the first opening portion 62 via the spherical receiving portion 64 to a midway of the circular opening portion 66. A ball joint portion 77 (see FIG. 7) of the belt clip 50 is coupled to the coupling portion 61 formed as described above. When the ball joint portion 77 is coupled to the coupling portion 61, the belt clip 50 is mounted to the back wall 33 of the casing 3 (see FIG. 3).

Figure 7:
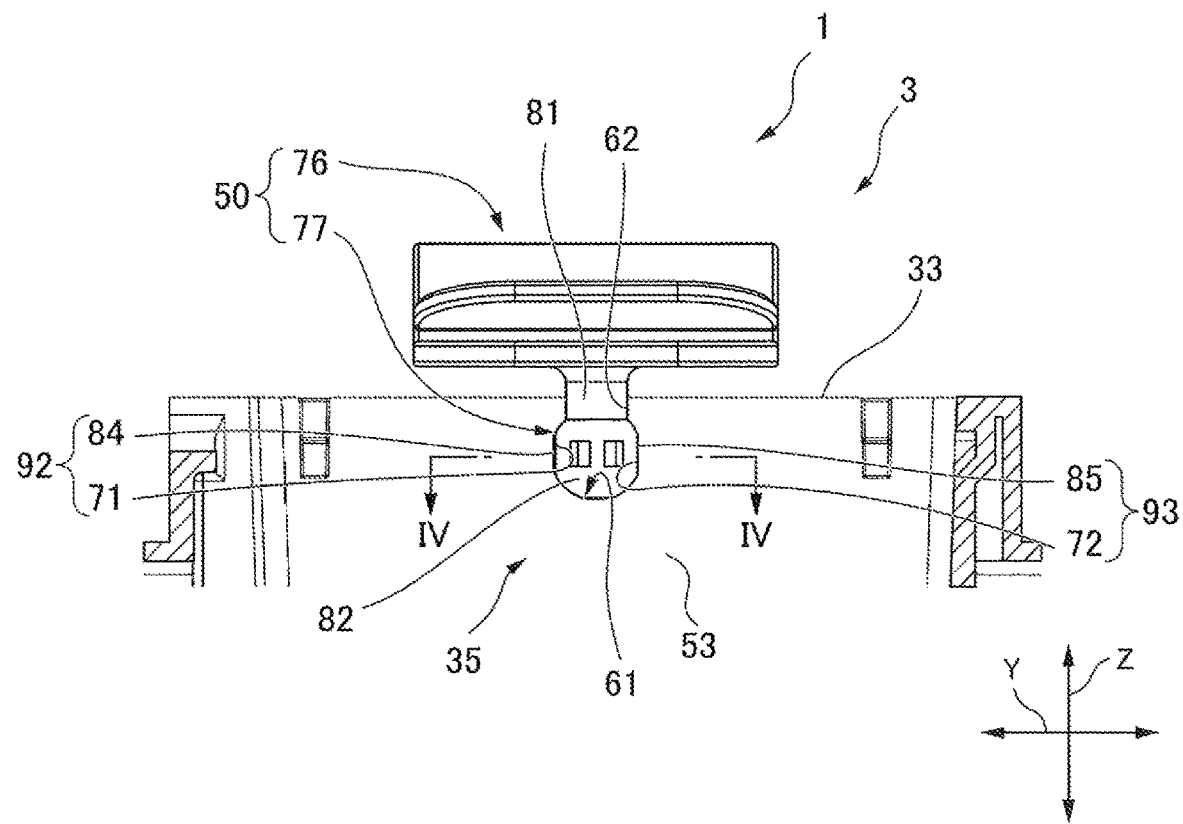
FIG. 7 is a front view for illustrating a state in which a belt clip is fitted to the coupling portion of the casing in the first embodiment of the present invention.
Figure 8:
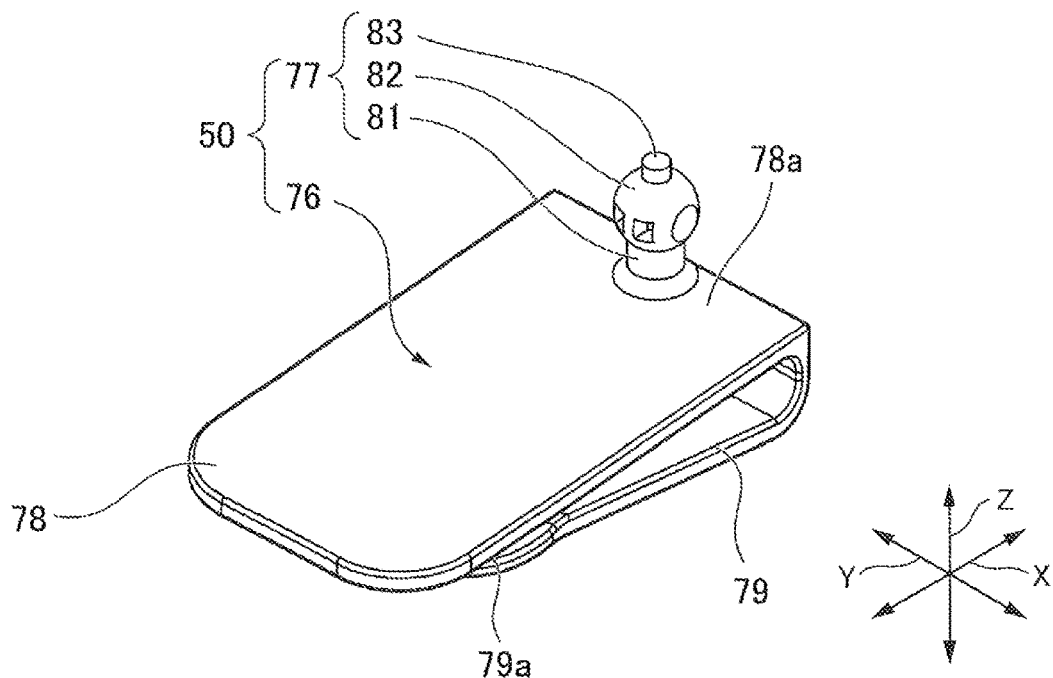
FIG. 8 is a perspective view for illustrating the belt clip in the first embodiment of the present invention.

FIG. 7 is a front view for illustrating a state in which the belt clip 50 is fitted to the coupling portion 61 of the casing 3. FIG. 8 is a perspective view for illustrating the belt clip 50. As illustrated in FIG. 7 and FIG. 8, the belt clip 50 is integrally formed of a resin material, and includes a clip main body 76 and the ball joint portion (joint portion) 77. The clip main body 76 includes a first clip portion 78 and a second clip portion 79. The first clip portion 78 is formed into a rectangular shape, and the second clip portion 79 is formed integrally with a proximal portion 78a of the first clip portion 78. By elastically deforming the second clip portion 79 to separate a distal end portion 79a of the second clip portion 79 away from the first clip portion 78, a belt on a user for the printer 1 may be fitted into a space between the first clip portion 78 and the second clip portion 79. In this manner, the belt clip 50 may be mounted to the belt on the user. The ball joint portion 77 is formed integrally with the proximal portion 78a of the first clip portion 78.

The ball joint portion 77 is protruded from the proximal portion 78a of the first clip portion 78 to a side opposite to the second clip portion 79. The ball joint portion 77 includes a joint neck portion 81, a joint spherical body 82, and a joint shank portion 83. The joint neck portion 81, the joint spherical body 82, and the joint shank portion 83 are integrally formed of a resin material to be coaxial with each other.

Figure 9:
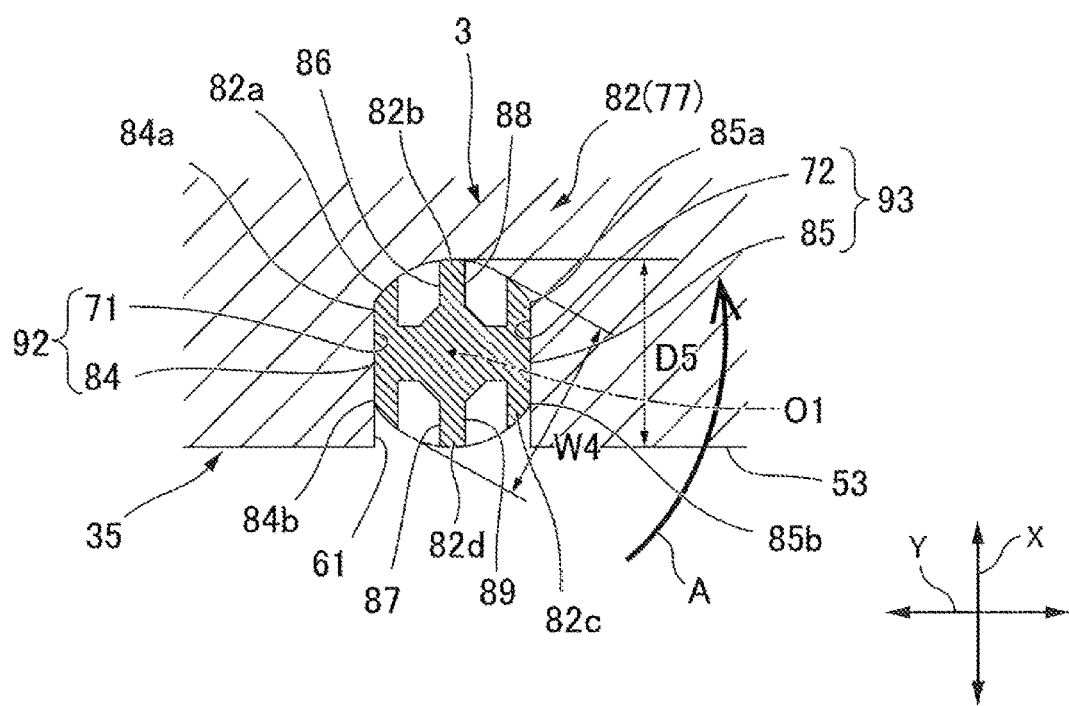
FIG. 9 is a sectional view for illustrating the printer according to the first embodiment of the present invention taken along the line IV-IV of FIG. 7.

FIG. 9 is a sectional view for illustrating the printer 1 taken along the line IV-IV of FIG. 7. As illustrated in FIG. 7 and FIG. 9, the joint neck portion 81 is formed into a columnar shape having a diameter D4, and is fitted to the first opening portion 62 of the coupling portion 61 so as to be freely pivotable. The joint spherical body 82 is formed into a spherical shape having a diameter D5, and is fitted to the spherical receiving portion 64 (see FIG. 5) of the coupling portion 61 so as to be freely pivotable. Under this state, a contact state of the joint spherical body 82 with, for example, the spherical receiving portion 64 of the coupling portion 61 is kept. The joint spherical body 82 has a spherical surface, and includes a pair of spherical chamfered portions 84 and 85 and a plurality of groove portions 86 to 89. In the following description, the plurality of groove portions 86 to 89 are referred to as first to fourth groove portions 86 to 89. Further, the pair of spherical chamfered portions 84 and 85 are referred to as a first spherical chamfered portion 84 and a second spherical chamfered portion 85, respectively.

The first spherical chamfered portion 84 and the second spherical chamfered portion 85 are formed to be flat on both side portions of the joint spherical body 82, which are opposed to each other in the Y direction under a state in which the belt clip 50 is mounted at a mounting position in the back wall 33 of the casing 3. Herein, the mounting position refers to a position at which the belt clip 50 is arranged along the X direction so as to cover the battery 40 as illustrated in FIG. 3. A spherical chamfer width W3 between the first spherical chamfered portion 84 and the second spherical chamfered portion 85 is set to be smaller than the diameter D5 of the joint spherical body 82.

Under a state in which the belt clip 50 is mounted at the mounting position in the back wall 33 of the casing 3, the first spherical chamfered portion 84 and the second spherical chamfered portion 85 are arranged at positions of being opposed to a first chamfered portion 71 and a second chamfered portion 72 of the coupling portion 61, respectively. Under this state, a contact state of the first spherical chamfered portion 84 with, for example, the first chamfered portion 71 and a contact state of the second spherical chamfered portion 85 with, for example, the second chamfered portion 72 are kept. In this case, for example, under a state in which the first spherical chamfered portion 84 is opposed to the first chamfered portion 71, a first engagement portion (engagement portion) 92 is formed. Further, under a state in which the second spherical chamfered portion 85 is opposed to the second chamfered portion 72, a second engagement portion (engagement portion) 93 is formed. The first engagement portion 92 and the second engagement portion 93 are formed along a pivoting direction of the belt clip 50 in at least two locations at a given interval.

The first to fourth groove portions 86 to 89 are formed in a region between the first spherical chamfered portion 84 and the second spherical chamfered portion 85 in the spherical surface of the joint spherical body 82 at positions avoiding the first spherical chamfered portion 84 and the second spherical chamfered portion 85. The first groove portion 86 is formed on one end 84a side of the first spherical chamfered portion 84. The second groove portion 87 is formed on another end 84b side of the first spherical chamfered portion 84. The third groove portion 88 is formed on one end 85a side of the second spherical chamfered portion 85. The fourth groove portion 89 is formed on another end 85b side of the second spherical chamfered portion 85.

Owing to formation of the first to fourth groove portions 86 to 89 in the joint spherical body 82, the joint spherical body 82 may be elastically deformed further suitably. Further, owing to formation of the first to fourth groove portions 86 to 89 in the joint spherical body 82, when the belt clip 50 is molded from a resin material, formation of shrink marks on the joint spherical body 82 may be prevented. Accordingly, the joint spherical body 82 may be molded with high accuracy.

Further, the first groove portion 86 and the fourth groove portion 89 are formed so as to be opposed to each other across a pivot center O1 of the ball joint portion 77. A groove width dimension between the first groove portion 86 and the fourth groove portion 89 is represented by W4. The third groove portion 88 and the second groove portion 87 are formed so as to be opposed to each other across the pivot center O1 of the ball joint portion 77. A groove width dimension between the third groove portion 88 and the second groove portion 87 is represented by W4. The groove width dimension W4 is set to be smaller than the diameter D5 of the joint spherical body 82.

Figure 10:
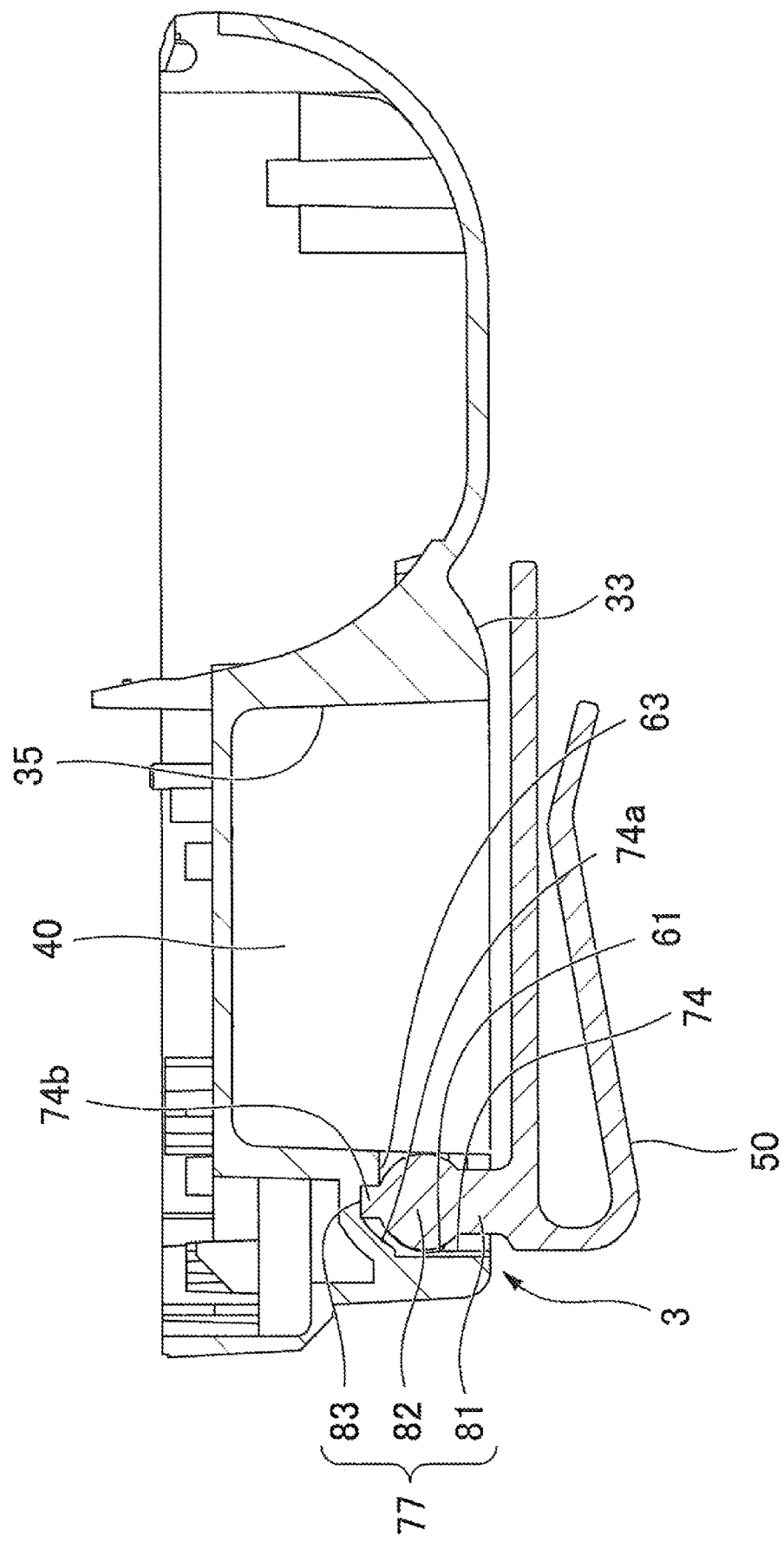
FIG. 10 is a sectional view for illustrating a state in which the battery in the first embodiment of the present invention is covered with the belt clip.

FIG. 10 is a sectional view for illustrating a state in which the battery 40 is covered with the belt clip 50. As illustrated in FIG. 10, the joint shank portion 83 is formed into a columnar shape having a diameter D6 smaller than that of the joint neck portion 81, and is fitted to a groove portion 74a of the guide groove portion 74 of the coupling portion 61, which is formed in the spherical receiving portion 64, so as to be freely pivotable. Under this state, a contact state of the joint shank portion 83 with, for example, an end portion 74b of the guide groove portion 74 is kept. Accordingly, the belt clip 50 may be prevented from moving with the joint spherical body 82 as a center in a direction of separating away from the back wall 33 of the casing 3. With this, the belt clip 50 is held in a stable state along the back wall 33 of the casing 3 (in a state of being mounted at a use position in FIG. 3 and FIG. 10).

Under a state in which the ball joint portion 77 is coupled to the coupling portion 61, the battery 40 is accommodated in the battery accommodation portion 35. The second opening portion 63 of the coupling portion 61 is closed by the accommodated battery 40. Accordingly, the ball joint portion 77 is held under a state of being fitted to the coupling portion 61. That is, the battery 40 may be also used as a member configured to hold the ball joint portion 77 in the coupling portion 61. Thus, the number of components may be reduced, and simplification of the configuration may be achieved.

Figure 11:
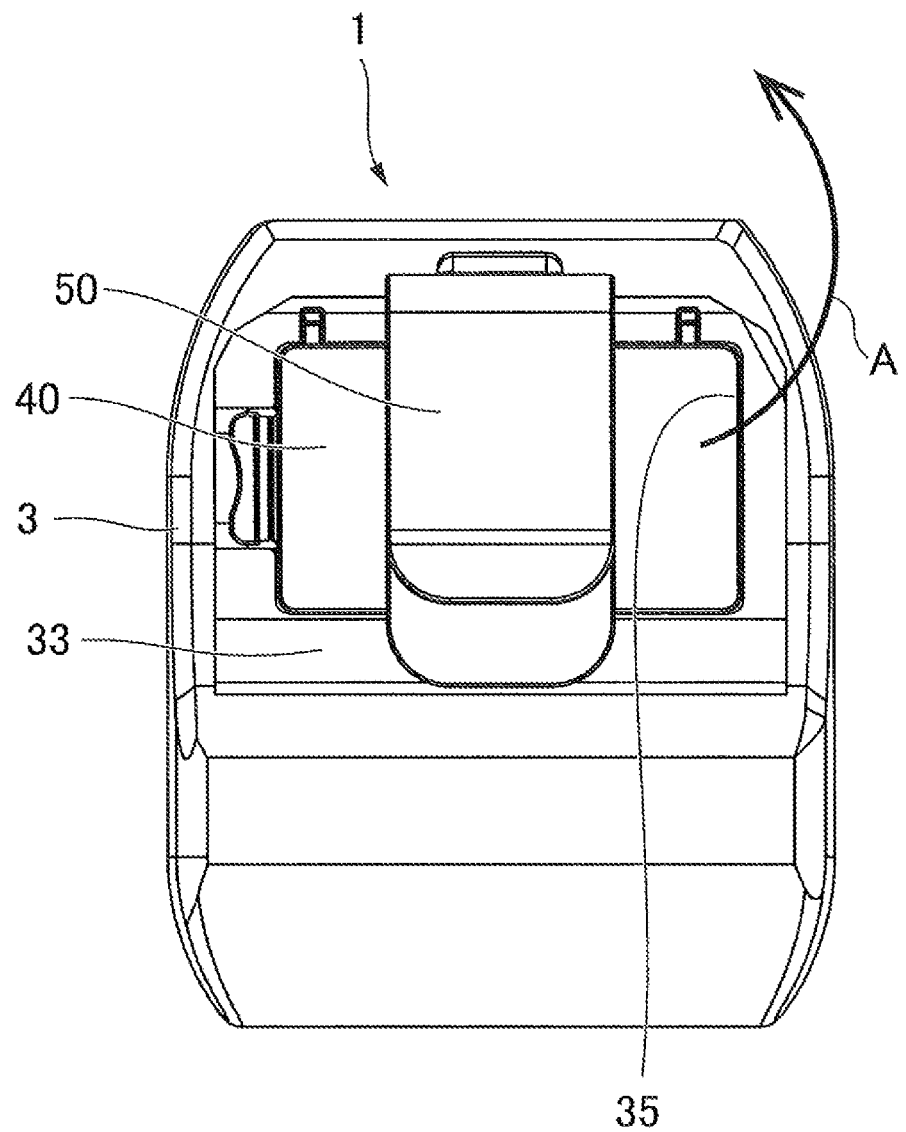
FIG. 11 is a back view for illustrating a state in which the belt clip of the printer according to the first embodiment of the present invention is arranged at a mounting position.
Figure 11:
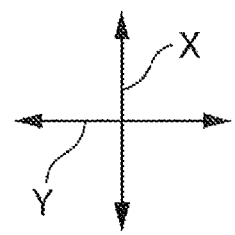

FIG. 11 is a back view for illustrating a state in which the belt clip 50 of the printer 1 is arranged at the mounting position. As illustrated in FIG. 9 and FIG. 11, under a state in which the belt clip 50 is mounted at a use position in the back wall 33 of the casing 3, the first engagement portion 92 is formed under a state in which the first spherical chamfered portion 84 is opposed to the first chamfered portion 71. Further, the second engagement portion 93 is formed under a state in which the second spherical chamfered portion 85 is opposed to the second chamfered portion 72.

With this structure, under a state in which the belt clip 50 is arranged at the mounting position along the back wall 33 of the casing 3, the first engagement portion 92 and the second engagement portion 93 may restrain the belt clip 50 from shifting from the mounting position. Accordingly, with a simple configuration having the ball joint portion 77 of the belt clip 50 and the coupling portion 61, the belt clip 50 may be fitted to the coupling portion 61 so as to be pivotable, and may be restrained from shifting from the mounting position. Thus, the number of parts of the printer 1 may be reduced.

Further, the belt clip 50 (or the ball joint portion 77) may be stably held at the mounting position. Accordingly, for example, when the printer 1 is mounted to the belt through intermediation of the belt clip 50, the belt clip 50 may be stabilized. With this structure, such a trouble as mounting the printer 1 to the belt on the user is facilitated, thereby being capable of enhancing operability of the printer 1. Moreover, under a state in which the first engagement portion 92 and the second engagement portion 93 restrain the belt clip 50 from shifting from the mounting position, the battery 40 is covered with the belt clip 50. With this structure, the belt clip 50 may prevent the battery 40 from falling off the battery accommodation portion 35 of the casing 3.

From this state, the belt clip 50 is pivoted about the ball joint portion 77 along the back wall 33 of the casing 3 in a counterclockwise direction as indicated by the arrow A. The first to fourth groove portions 86 to 89 are formed in the joint spherical body 82. Moreover, the belt clip 50 (that is, the joint spherical body 82) is formed of a resin material so as to be elastically deformable. Specifically, when the belt clip 50 is pivoted about the ball joint portion 77 in the direction indicated by the arrow A, a relatively large load is applied. Thus, spherical portions 82a and 82b of the joint spherical body 82, which are on a side having the first groove portion 86 and the third groove portion 88, may be elastically deformed along the first chamfered portion 71. Similarly, spherical portions 82c and 82d of the joint spherical body 82, which are on a side having the fourth groove portion 89 and the second groove portion 87, may be elastically deformed along the second chamfered portion 72. Thus, the belt clip 50 may be pivoted about the ball joint portion 77 along the back wall 33 of the casing 3 in the direction indicated by the arrow A.

Specifically, when a predetermined external force is applied to the casing 3 in the direction indicated by the arrow A (pivoting direction) of the belt clip 50, restraining performed by the first engagement portion 92 and the second engagement portion 93 is canceled so that the belt clip 50 may be moved from the mounting position.

In this case, the groove width dimension W4 between the first groove portion 86 and the fourth groove portion 89 is set to be smaller than the diameter D5 of the joint spherical body 82. Further, the groove width dimension W4 between the third groove portion 88 and the second groove portion 87 is set to be smaller than the diameter D5 of the joint spherical body 82. The first groove portion 86 and the third groove portion 88 reach the first chamfered portion 71. Similarly, the fourth groove portion 89 and the second groove portion 87 reach the second chamfered portion 72. At this time, the load acting on the belt clip 50 may be reduced. As described above, when the belt clip 50 is pivoted, magnitudes of loads generated on the first to fourth groove portions 86 to 89 and the spherical portions 82a to 82d may be varied. Thus, when the ball joint portion 77 is pivoted, satisfactory click feeling may be obtained.

Further, the first groove portion 86 and the fourth groove portion 89 are formed so as to be opposed to each other across the pivot center O1 of the ball joint portion 77. The second groove portion 87 and the third groove portion 88 are formed so as to be opposed to each other across the pivot center O1 of the ball joint portion 77. Accordingly, for example, when the belt clip 50 is turned in a clockwise direction opposite to the counterclockwise direction, similarly to the first groove portion 86 and the fourth groove portion 89, which are opposed to each other, the second groove portion 87 and the fourth groove portion 88, which are opposed to each other may be elastically deformed. With this structure, when the belt clip 50 is pivoted in the clockwise direction, the same click feeling as that in the case of turning the belt clip 50 in the counterclockwise direction may be obtained.

Figure 12:
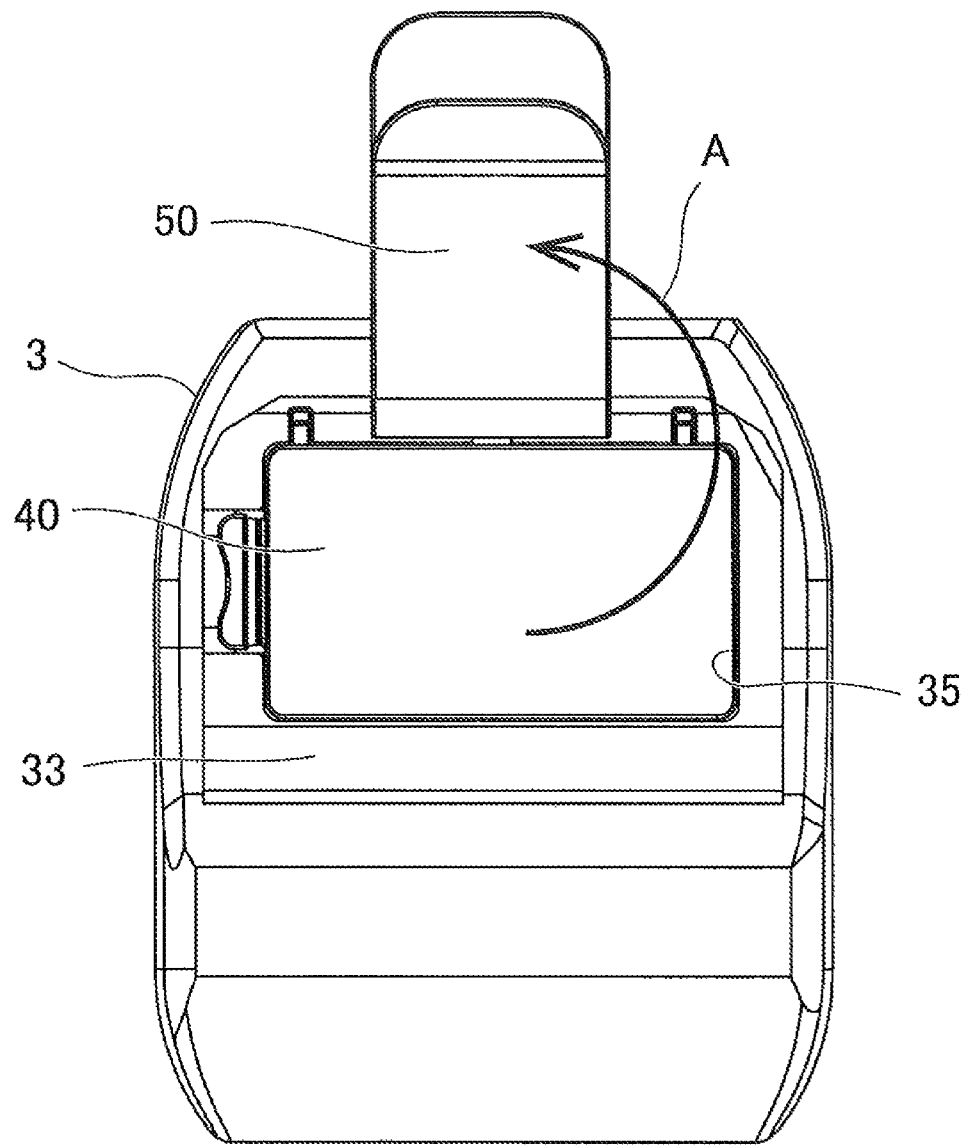
FIG. 12 a back view for illustrating a state in which the belt clip of the printer according to the first embodiment of the present invention is arranged at a removable position.
Figure 12:
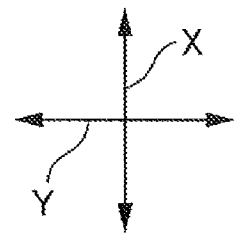

FIG. 12 is a back view for illustrating a state in which the belt clip 50 of the printer 1 is arranged at a removable position. As illustrated in FIG. 9 and FIG. 12, when the belt clip 50 is pivoted in the direction indicated by the arrow A, the belt clip 50 is arranged at the removable position. Herein, the removable position refers to a position at which the belt clip 50 is arranged away from the battery 40 along the X direction. A contact state of the first spherical chamfered portion 84 with the second chamfered portion 72 is kept. A contact state of the second spherical chamfered portion 85 with the first chamfered portion 71 is kept. With this structure, the belt clip 50 is stably held at the removable position.

The belt clip 50 is arranged at the removable position so that the belt clip 50 is arranged at a position of avoiding the battery 40. Accordingly, the battery 40 may be removed from the battery accommodation portion 35. When the battery 40 is removed from the battery accommodation portion 35, fitting of the ball joint portion 77 of the belt clip 50 to the coupling portion 61 may easily be performed, or the fitting of the ball joint portion 77 of the belt clip 50 to the coupling portion 61 may easily be canceled.

Figure 13A:
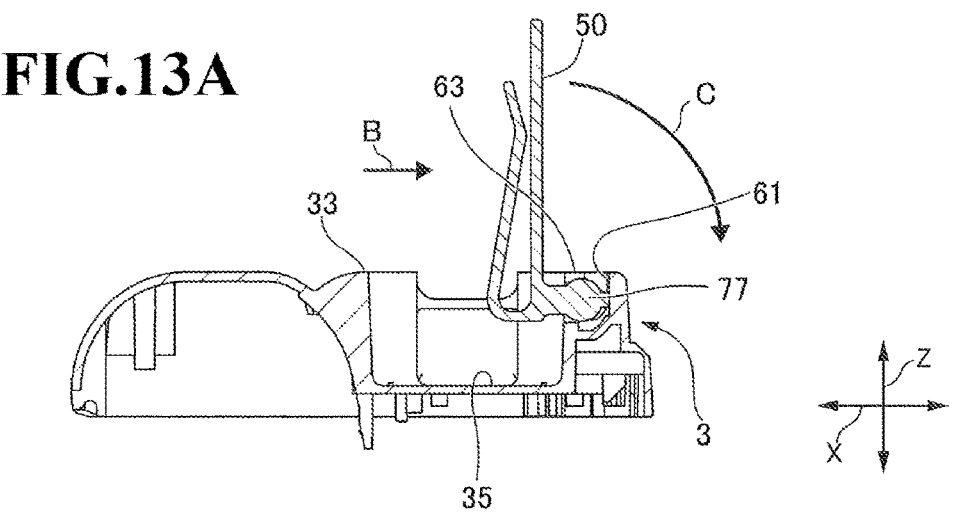
FIG. 13A is a sectional view for illustrating an example in which a ball joint portion of the belt clip is fitted to the coupling portion of the casing in the first embodiment of the present invention.
Figure 13B:
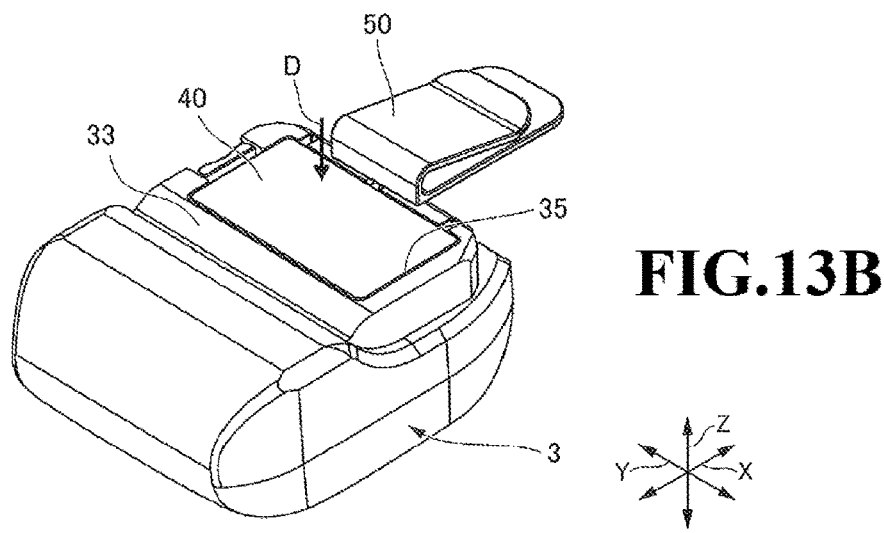
FIG. 13B is a perspective view for illustrating an example in which the battery is accommodated in the battery accommodation portion of the casing.
Figure 13C:
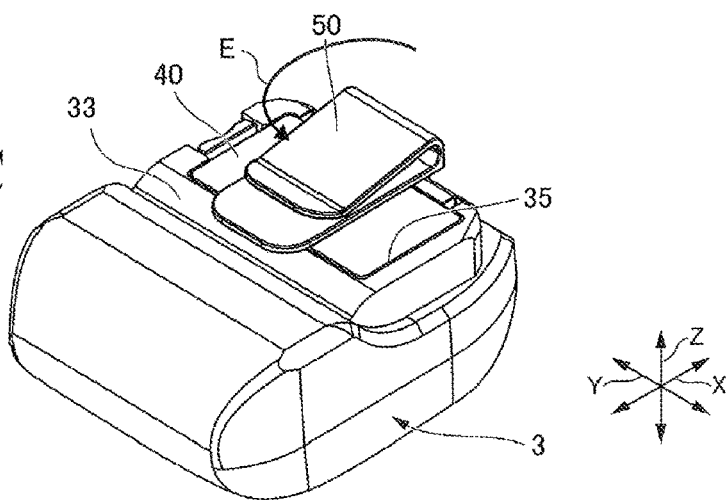
FIG. 13C is a perspective view for illustrating an example in which the battery is covered with the belt clip.

Next, with reference to FIG. 13A to FIG. 13C, description is made of an example in which the ball joint portion 77 of the belt clip 50 is fitted to the coupling portion 61 to mount the belt clip 50 to the casing 3. FIG. 13A is a sectional view for illustrating an example in which the ball joint portion 77 of the belt clip 50 is fitted to the coupling portion 61 of the casing 3. FIG. 13B is a perspective view for illustrating an example in which the battery 40 is accommodated in the battery accommodation portion 35 of the casing 3. FIG. 13C is a perspective view for illustrating an example in which the battery 40 is covered with the belt clip 50.

As illustrated in FIG. 13A, under a state in which the battery 40 (see FIG. 12) is removed from the battery accommodation portion 35, the belt clip 50 is arranged so as to intersect the back wall 33 of the casing 3. Under this state, the ball joint portion 77 of the belt clip 50 is fitted to the coupling portion 61 through the second opening portion 63 of the coupling portion 61 in a direction indicated by the arrow B. Through use of the ball joint portion 77 fitted to the coupling portion 61 as a fulcrum, the belt clip 50 may be rocked in a direction indicated by the arrow C.

As illustrated in FIG. 13B, the belt clip 50 is arranged at the position avoiding the battery accommodation portion 35. Under this state, the battery 40 is accommodated in the battery accommodation portion 35 in a direction indicated by the arrow D. The second opening portion 63 (see FIG. 13A) of the coupling portion 61 is closed by the accommodated battery 40. Accordingly, the ball joint portion 77 is held in a state of being fitted to the coupling portion 61.

As illustrated in FIG. 13C, the belt clip 50 is turned about the ball joint portion 77 (FIG. 13A) in a direction indicated by the arrow E. The battery 40 is covered with the belt clip 50. Thus, the belt clip 50 may prevent the battery 40 from falling off the battery accommodation portion 35 of the casing 3.

Second Embodiment

Figure 14:
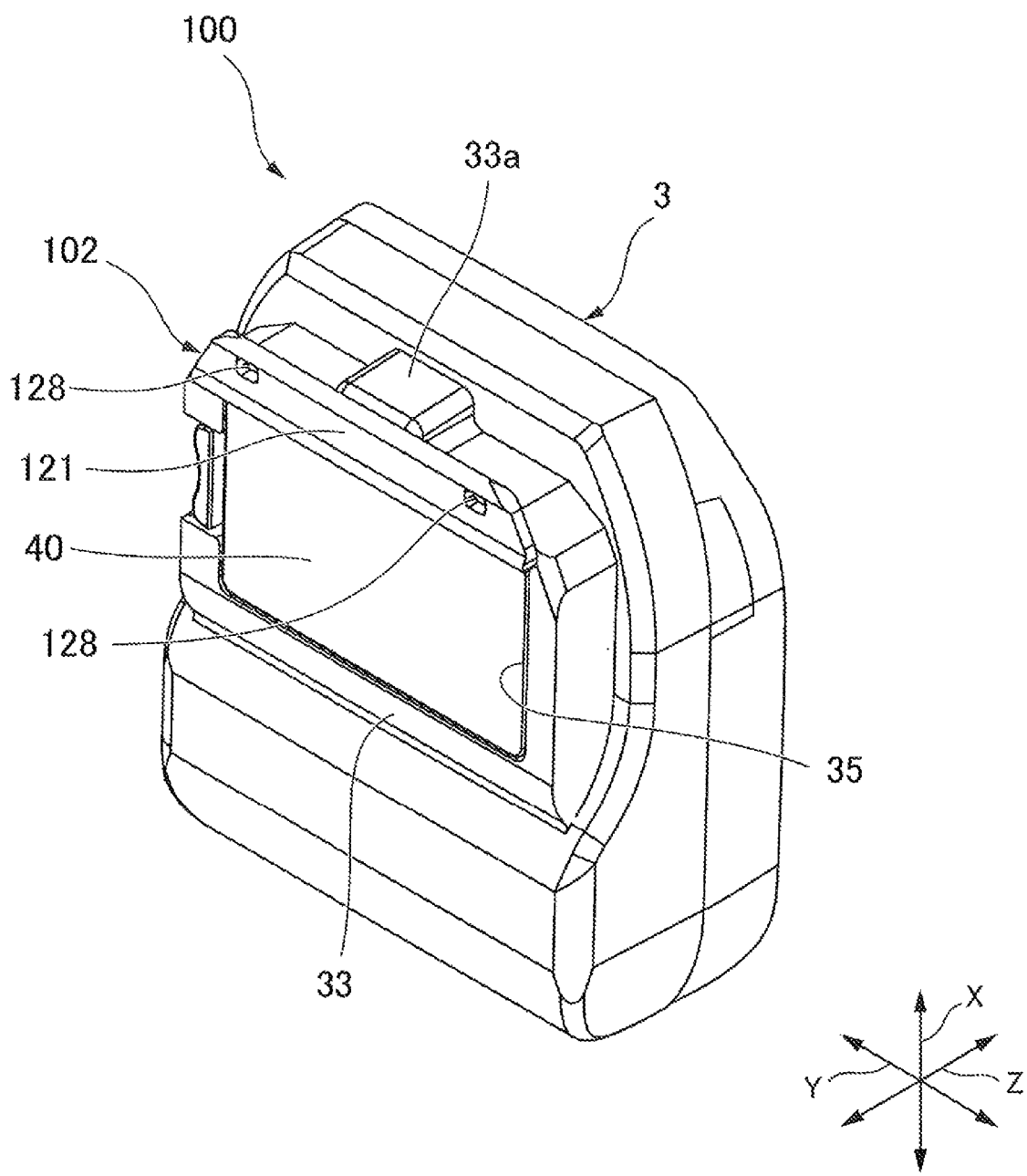
FIG. 14 is a perspective view for illustrating a printer according to a second embodiment of the present invention as seen from a back wall side thereof.
Figure 15:
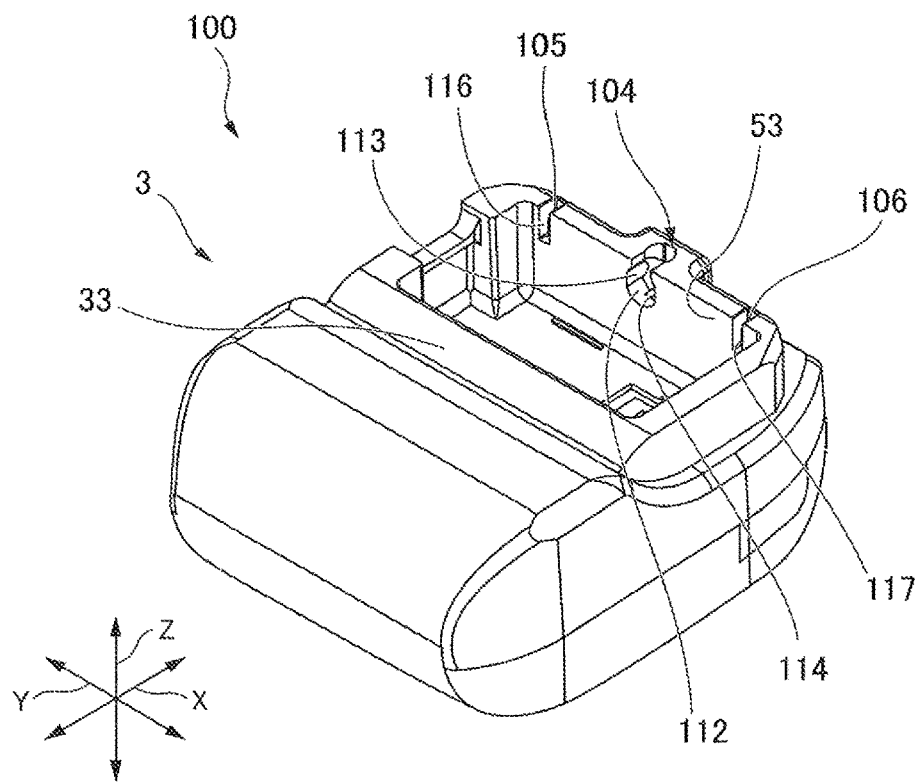
FIG. 15 is a perspective view for illustrating the printer according to the second embodiment of the present invention from which an attachment member and the battery are removed.
Figure 16:
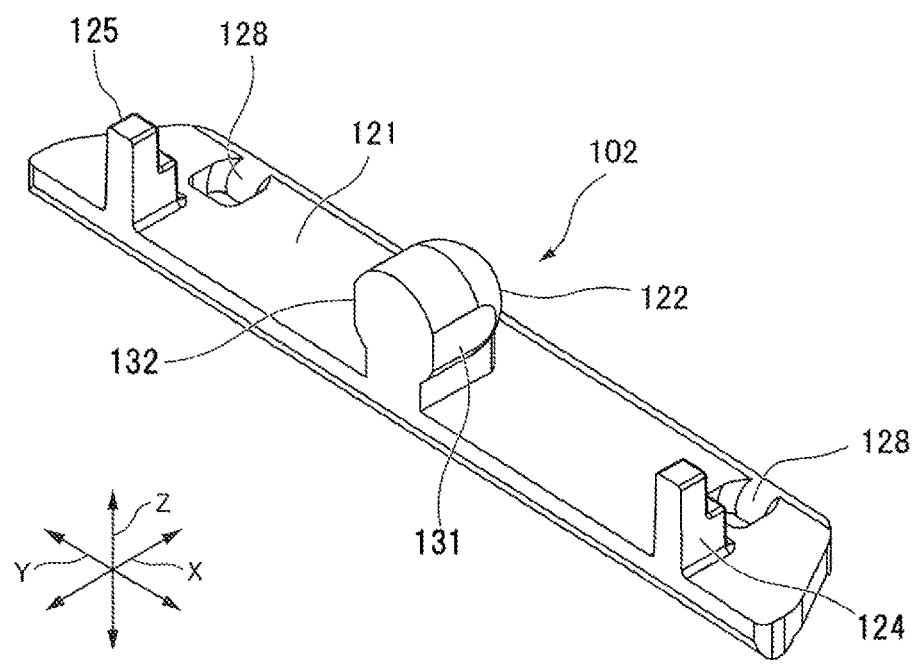
FIG. 16 a perspective view for illustrating the attachment member in the second embodiment of the present invention.

Next, description is made of a printer 100 according to a second embodiment of the present invention with reference to FIG. 14 to FIG. 16. In the printer 100 according to the second embodiment, components that are the same as or similar to those of the printer 1 according to the first embodiment are denoted by the same reference symbols, and detailed description thereof is omitted.

FIG. 14 is a perspective view for illustrating the printer 100 as seen from a back wall side thereof. As illustrated in FIG. 14, in the printer 100, an attachment member 102 for a strap is used in place of the belt clip 50 of the printer 1 according to the first embodiment, and the remaining configuration is the same as that of the printer 1 according to the first embodiment. In the printer 100, the attachment member 102 is mounted to the back wall 33 of the casing 3. The attachment member 102 is freely removably mounted to an end portion 33a of the back wall 33 of the casing 3 in the X direction so as to avoid the battery accommodation portion 35 and the battery 40.

FIG. 15 is a perspective view for illustrating the printer 100 from which the attachment member 102 and the battery 40 are removed. As illustrated in FIG. 15, the casing 3 includes a coupling recessed portion 104 and a pair of insertion recessed portions 105 and 106 formed in the back wall 33 of the casing 3 at vicinities of the battery accommodation portion 35. The coupling recessed portion 104 is formed at an end portion of the casing 3 in the X direction and at a center thereof in the Y direction. The coupling recessed portion 104 includes a coupling opening portion 112, a first chamfered portion 113, and a second chamfered portion 114. The first chamfered portion 113 and the second chamfered portion 114 are formed to be flat.

The coupling opening portion 112 is opened in the first side wall 53 of the battery accommodation portion 35. The first chamfered portion 113 and the second chamfered portion 114 are formed on portions opposed to each other in the Y direction. The pair of insertion recessed portions 105 and 106 are formed on both sides of the coupling recessed portion 104 in the Y direction, respectively. The pair of insertion recessed portions 105 and 106 include insertion opening portions 116 and 117, respectively, which are opened in the first side wall 53 of the battery accommodation portion 35. The attachment member 102 (see FIG. 16) is freely removably mounted to the coupling recessed portion 104 and the pair of insertion recessed portions 105 and 106.

FIG. 16 is a perspective view for illustrating the attachment member 102. As illustrated in FIG. 15 and FIG. 16, the attachment member 102 includes a support bracket 121, a coupling projecting portion (joint portion) 122, and a pair of ribs 124 and 125. The support bracket 121 is formed into a flat plate-like shape, and has a pair of hook holes 128 in both end portions thereof in the Y direction. The pair of hook holes 128 is formed to enable a strap to be coupled to the attachment member 102 through insertion of the strap. The coupling projecting portion 122 is formed at a center of the support bracket 121 in the Y direction. The coupling projecting portion 122 is formed so as to extend toward the X direction in a columnar shape. The coupling projecting portion 122 includes a first coupling chamfered portion 131 and a second coupling chamfered portion 132 at both ends thereof in the Y direction. The first coupling chamfered portion 131 and the second coupling chamfered portion 132 are formed to be flat.

The coupling projecting portion 122 is freely removably coupled to the coupling recessed portion 104 through the coupling opening portion 112. Under a state in which the coupling projecting portion 122 is coupled to the coupling recessed portion 104, the first coupling chamfered portion 131 and the first chamfered portion 113 are arranged so as to be held in contact with each other in an opposed state. Under this state, the first coupling chamfered portion 131 and the first chamfered portion 113 form a first pivot restraining portion. Further, the second coupling chamfered portion 132 and the second chamfered portion 114 are arranged so as to be held in contact with each other in an opposed state. Under this state, the second coupling chamfered portion 132 and the second chamfered portion 114 form a second pivot restraining portion. The coupling projecting portion 122 is formed into a columnar shape, and the first pivot restraining portion and the second pivot restraining portion are formed. With this, the attachment member 102 is restrained from pivoting. Further, the pair of ribs 124 and 125 are freely removably coupled to the insertion recessed portions 105 and 106, respectively, through the pair of insertion opening portions 116 and 117. Thus, pivoting of the attachment member 102 is further satisfactorily restrained.

Under a state in which the attachment member 102 is mounted to the back wall 33 of the casing 3, the battery 40 is accommodated in the battery accommodation portion 35. Accordingly, the coupling opening portion 112 of the coupling recessed portion and the insertion opening portions of the insertion recessed portions are closed by the battery 40. With this, the attachment member 102 may be prevented from being removed from the back wall 33 of the casing 3. Meanwhile, when the attachment member is removed from the back wall 33 of the casing 3, the battery 40 is removed from the battery accommodation portion 35 so that the coupling projecting portion 122 may be removed from the coupling opening portion 112 of the coupling recessed portion 104. Further, the pair of ribs 124 and 125 may be removed from the pair of insertion opening portions 116 and 117, respectively, of the insertion recessed portions 105 and 106. Thus, the attachment member 102 may easily be mounted to and removed from the back wall 33 of the casing 3.

In the printer 100 according to the second embodiment, the attachment member 102 is removably mounted to the casing 3, and the pair of hook holes 128 is formed in the attachment member 102. A strap may be mounted to the pair of hook holes 128. Accordingly, the strap may be removably mounted to the attachment member 102. With this, when the printer 100 is used in a carried state, the attachment member 102 is mounted to the casing 3 so that the strap may be mounted to the printer 100 through intermediation of the attachment member 102. Through use of the strap, the printer 100 may be used in a carried state of being suspended from a shoulder or a neck.

Meanwhile, when the printer 100 is used under a state of being put at a predetermined position without being carried, the attachment member 102 is removed from the casing 3 so that the attachment member 102 and the strap may be removed from the printer 100. With this structure, when the printer 100 is used under a state of being put at the predetermined position, it is not required to consider an installation space for installing the attachment member 102 and the strap, and thus an installation position for the printer 100 may easily be secured. Further, when the printer 100 is used under a state of being put at the predetermined position without being carried, the attachment member 102 and the strap may be omitted. Thus, cost of the printer 100 may be reduced.

Further, pivoting of the attachment member 102 is restrained by the first pivot restraining portion and the second pivot restraining portion. Accordingly, when the printer 100 is in the carried state of being suspended from a shoulder or a neck through use of the strap, the printer 100 may be kept in a stable state when the recording sheet P1 is cut through use of the first cutting blade 26 or the second cutting blade 27 (that is, a manual cutter) illustrated in FIG. 2. Thus, the recording sheet P1 may be unforcedly and satisfactorily cut by the first cutting blade 26 or the second cutting blade 27, and hence operability of the printer 100 may be enhanced.

Note that, the technical scope of the present invention is not limited to the above-mentioned embodiments, but various modifications may be made without departing from the gist of the present invention. For example, in the first embodiment, description is made of the example in which the mounting position of the belt clip 50 is the position at which the belt clip 50 is arranged along the X direction so as to cover the battery 40, but the present invention is not limited thereto. As another example, for example, the mounting position of the belt clip 50 may be a position at which the belt clip 50 is arranged obliquely to the X direction so as to cover at least a part of the battery 40.

Further, in the first embodiment, description is made of the example in which two engagement portions, namely, the first engagement portion 92 and the second engagement portion 93 are provided as the engagement portion, but the present invention is not limited thereto. As another example, for example, three or more engagement portions may be provided.

Moreover, in the first embodiment, the belt clip 50 to be mounted to a belt on a user is exemplified as a clip, but the present invention is not limited thereto. As another example, a clip may be mounted to a different portion.

What is claimed is:
1. A printer, comprising:
 a housing configured to accommodate a recording sheet and a printing portion;
 a battery to be removably mounted to the housing; and
 a clip pivotably mounted to the housing,
 wherein the clip includes a joint portion, which is elastically deformable so that a coupling portion of the housing is pivotably fitted to the joint portion,
 wherein a chamfered portion of the joint portion and a chamfered portion of the coupling portion form an engagement portion that is configured to restrain the clip from pivoting at a mounting position at which the clip covers at least a part of the battery, and
 wherein, when a predetermined external force is applied to the housing in a pivoting direction of the clip, restraining of the clip by the engagement portions is canceled so that the clip is movable from the mounting position.

2. The printer according to claim 1, further comprising a battery accommodation portion, which is formed in the housing such that the battery is to be removably mounted therein, wherein the coupling portion is a recessed portion having an opening portion, which is formed in a side wall of the battery accommodation portion such that the joint portion is to be removably fitted therethrough.

3. The printer according to claim 2, wherein the engagement portion of the joint portion and the coupling portion comprises at least two engagement portions formed along the pivoting direction of the clip at a given interval.

4. The printer according to claim 3, wherein the joint portion comprises a plurality of groove portions formed along the pivoting direction of the clip so that deformation of the joint portion is allowed when the clip is pivoted.

5. The printer according to claim 4, wherein the plurality of groove portions of the joint portion are formed so as to be opposed to one another across a pivot center of the joint portion.

6. The printer according to claim 1, wherein the engagement portion of the joint portion and the coupling portion comprises at least two engagement portions formed along the pivoting direction of the clip at a given interval.

7. The printer according to claim 1, wherein the joint portion comprises a plurality of groove portions formed along the pivoting direction of the clip so that deformation of the joint portion is allowed when the clip is pivoted.

8. The printer according to claim 7, wherein the plurality of groove portions of the joint portion are formed so as to be opposed to one another across a pivot center of the joint portion.

* * * * *